United States Patent [19]

Nunlist

[11] Patent Number: 4,497,418
[45] Date of Patent: Feb. 5, 1985

[54] REPAIR PLUG ASSEMBLY FOR VESSEL HAVING A CORROSION RESISTANT LINING

[75] Inventor: Erwin J. Nunlist, Penfield, N.Y.

[73] Assignee: Kennecott Corporation, Cleveland, Ohio

[21] Appl. No.: 580,319

[22] Filed: Feb. 15, 1984

[51] Int. Cl.³ .............................................. B65D 53/00
[52] U.S. Cl. .................................... 220/234; 220/200; 220/378; 29/402.11; 29/402.12; 29/402.15; 138/97; 138/99
[58] Field of Search ....................... 220/200, 234, 378; 29/402.09, 402.11, 402.12, 402.14, 402.15, 402.17; 138/97, 98, 99

[56] References Cited

U.S. PATENT DOCUMENTS

| 172,528 | 1/1876 | Walker | 220/234 |
| 3,236,407 | 2/1966 | Zelman et al. | 220/200 |
| 4,078,697 | 3/1978 | Schlosberg et al. | 220/378 |

Primary Examiner—George T. Hall
Attorney, Agent, or Firm—R. Lawrence Sahr

[57] ABSTRACT

A repair plug assembly for repairing a defect such as a hole in the lined surface of a corrosion resistant glass or vitreous lined metal vessel and which assembly includes a stud affixed in the hole of the vessel and having an exposed unthreaded surface at the lined surface over which is packed a flexible and compactible sealing material which is contained in sealing position over the hole opening by means of a containing ring and overlying dome-shaped cap member.

14 Claims, 6 Drawing Figures

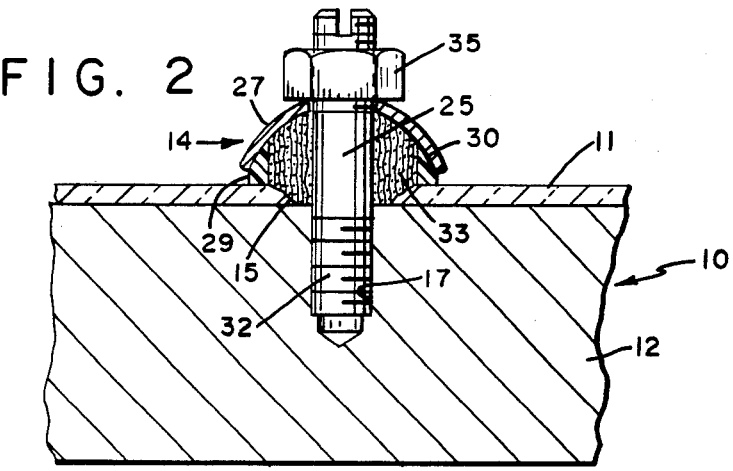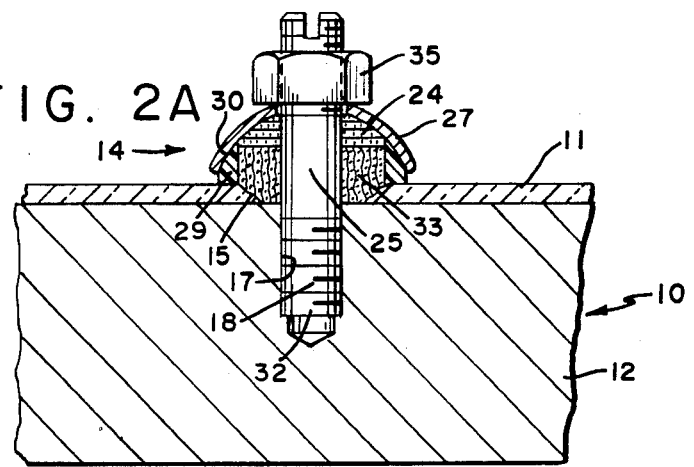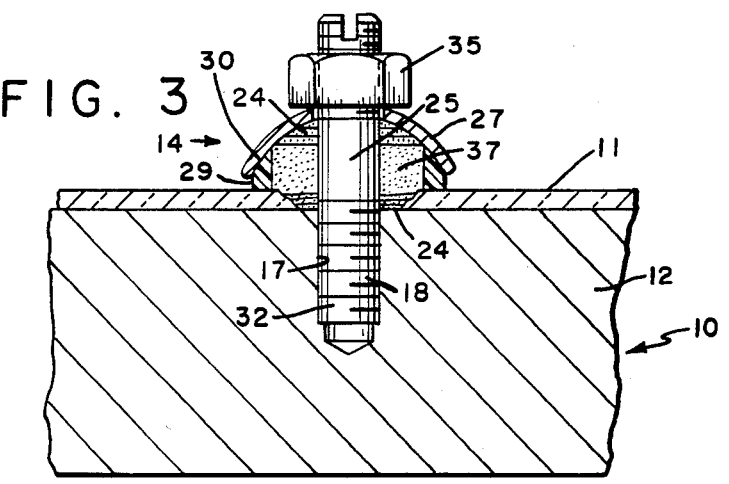

REPAIR PLUG ASSEMBLY FOR VESSEL HAVING A CORROSION RESISTANT LINING

The present invention relates to new and useful improvements in repair means for vessels having metal wall surfaces protected by corrosion resistant linings and more particularly to a repair plug assembly for use in the repair of a breach occurring in the glass or vitreous lined surface of such a vessel.

Metal vessels or reactors having corrosion resistant lined wall surfaces of glass or vitreous enamel are well known and have many industrial uses for handling chemical process liquids some of which are of a highly corrosive nature. It is a common occurrence in use of these vessels for defects such as cracks or pin hole openings to develop in the glass surface during use or manufacture. In order to prevent further damage to the vessel it has been a usual practice to provide repair plugs to fit into the holes and together with a suitable gasket seal the area of damage or defect from further deterioration.

Prior art repair plugs assembly are typified by the devices disclosed in U.S. Pat. Nos. 2,631,360; 3,236,407; 3,440,707 and 4,078,697. In general, these patents disclose means for repairing breaks in the glass lining of a lined reactor by anchoring a stud in the fracture. A sealing gasket is disposed over the stud on the outer portion of the protective lining surrounding the break with a washer of some type holding the gasket in place. In addition, a corrosion resistant cement is provided about the exposed threaded end of the stud beneath a dome-shaped cap member which has a peripheral lower edge engaging the gasket and locked thereto by a nut threaded about the exposed end of the stud.

Although these known repair plugs may have proven acceptable for their intended purposes problems are encountered in their use in certain highly oxidizing environments such as in the storage or treatment of bromine compounds. It has been found that none of the commonly used cements and gasket materials which encompass the repair plug can suitably resist chemical attack which leads to undesirable leakages. Also in temperatures above 350° F. other chemical compounds render such repair plugs unreliable and it has been found that gasket material made of tetra fluoroethylene resins (PTFE) will swell and/or become permeable resulting in further deterioration of the glass lining. Further problems are encountered in applying a uniform gasket sealing when the surface contour of the vessel wall is curved as found in a vessel nozzle swedge area. It is necessary to shape the edge of the protective disc to the contour of the coated vessel surface which is time consuming and requires a high degree of manufacturing skill. Other problems are encountered in the potential leakage along the exposed threaded area of the stud.

It is an object of the present invention to provide a novel repair plug assembly for use in a glass lined vessel.

A further object is to provide a novel repair plug assembly that employs reliably flexible and compactible sealing material such as a compactible graphite or similar material with similar sealing properties.

Another object is to provide novel means for protecting the sealing member of a repair plug assembly from chemical corrosion or erosion and that is equally reliable in highly oxidizing environments and in high temperature conditions.

A still further object is the use of a flexible graphite material about the exposed end of a repair stud or plug that not only seals against the glass surface but that simultaneously prevents leakage along the surface of the stud.

SUMMARY OF THE INVENTION

The present invention contemplates a novel repair plug assembly for repairing breaches or defects in the linings of a glass lined vessel such as pinhole openings or the like. The plug assembly comprises a stud having a threaded portion inserted into the damaged area and provided with an exposed portion at the glass surface. After fastening the stud in place a flexible and compactible packing material in the form of either washers or flexible packing ribbon or combination of such material is placed over the exposed unthreaded surface of the stud and surrounded by a containment ring such as a PTFE wedge or metallic hoop. A domed shaped cap is placed over the flexible packing material and forced down upon the material by means of a threaded nut member on the stud to squeeze the material simultaneously into sealing relationship with both the exposed portion of the stud and the glass surface about the defective area.

The above and other objects and advantages of the present invention will appear more fully hereinafter from a consideration of the detailed description which follows taken together with the accompanying drawing wherein several embodiments of the present invention are illustrated.

DESCRIPTION OF THE DRAWINGS

In the Drawings:

FIGS. 2, 2A, 3, 4 and 5 are similar cross-sectional views of other embodiments of a repair plug assembly of the present invention.

DETAILED DESCRIPTION

Figure 1:
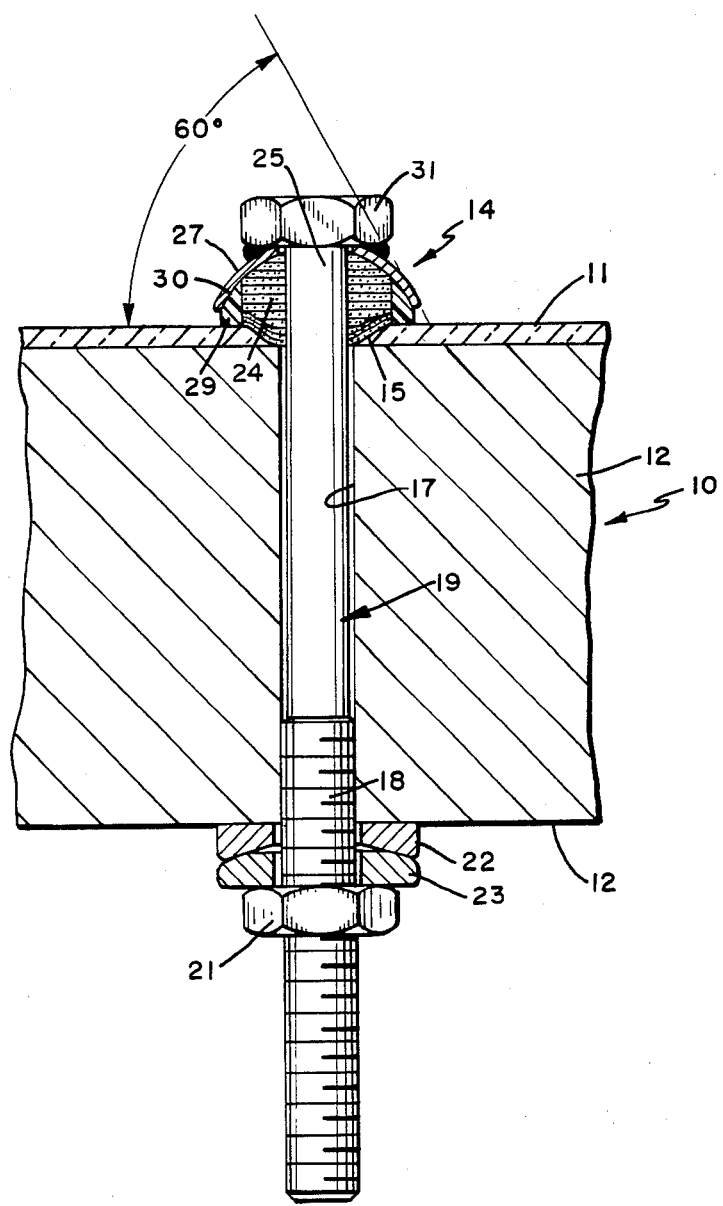
FIG. 1 is a cross-sectional view of an embodiment of a repair plug assembly of the present invention.

Referring now to the drawings, a portion of a reactor or vessel is generally designated by the reference numeral 10 having an inner corrosion resistant lining 11 such as glass or other vitreous or ceramic material affixed to a metal wall 12.

As mentioned it is the feature of the present invention to provide a novel means for repairing defects in the glass surface 11 such as pin hole openings that might occur during use or manufacture. To this end there is provided a repair plug assembly generally indicated by the reference numeral 14 for use when such a defect is noted in glass coating 11. Initially, a grinding wheel (not shown) is used to form a circular area 15 about the defective area in glass coating 11. A hole 17 is then drilled and tapped into wall 12 for receiving the threaded end portion 18 of an elongated stud 19 of repair plug assembly 14 which is made of a tantalum tungsten alloy material.

In the embodiment of FIG. 1 threaded portion 18 of stud 19 extends through wall 12 and is secured to the outer surface 20 thereof by fastening nut 21 which is locked against spherical washers 22-23 abutting against the outer surface of wall 12. A plurality of washers 24 of varying diameters (FIG. 1) are stacked about the upper exposed unthreaded surface 25 of stud 19 and over and into the defective area 15 in the glass coating 11.

Washers 24 are formed from a selected compactible packing material that is both flexible and resilient such as an asbestos packing or a flexible graphite such as that sold under the trademark Grafoil ® owned by the Union Carbide Corporation which is fully disclosed in U.S. Pat. No. 3,404,061 issued Oct. 1, 1968. This Grafoil material was found to provide a most desirable compactible and resilient packing material and consists essentially of graphite which is free of any resin binding or bonding material. It has been found to be chemically inert to most reagents and of excellent dimensional stability and reliable resiliency in one plane due to its anistropic properties.

In order to maintain washers 24 in position about unthreaded portion 25, repair plug assembly 14 further includes a containing ring member 29 formed of PTFE which encompasses the stacked washers 24. A dome-shaped cap member 27 which is made for example of a tantalum tungsten alloy is placed over the stack of graphite washer discs 24 and forced down upon washers 24 and wedge shaped rim 30 of ring member 29 by head 31 of stud 19 upon the tightening of nut 21.

The lower peripheral edges of dome-shaped cap 27 are angled relative to wall 12 at an angle approximately 60 degrees (as seen in FIG. 1). As stud 19 is tightened the undersurface of cap 27 squeezes the packing material of which washers 24 are compressed simultaneously against both the unthreaded surface 25 of stud 19 and glass coated surface 11 to provide a seal at both the glass coating surface 11 and stud 19 to prevent leakage between cap 30 and unthreaded surface 25 of stud 19.

In the embodiment of FIGS. 2 to 5 inclusive like reference numerals are applied to like elements of the embodiment of FIG. 1. In the embodiment of FIG. 2 a short stud 32 of the repair plug assembly 14 is threaded only partially into wall surface 12. In place of washers 24 there is provided a packing material comprised of a flexible and compactible ribbon wrap 33 selected from a material such as a flexible corrugated graphite ribbon also sold under the trademark Grafoil ® or a compactible cord type material such as sold under the trademark Gore-Tex ® owned by W. L. Gore & Associates. Wrap 33 is wound about the exposed unthreaded surface 25 of stud 32 and is contained in place by a PTFE wedge ring 29. Wrap 33 is also squeezed into sealing relationship against stud 32 and glass surface 11 by dome cap 27 as previously discussed with respect to the embodiment of FIG. 1 except that a nut 35 is used to fasten dome cap 27 against the packing material.

The embodiment as shown in FIG. 2A is similar to the embodiment of FIG. 2 except that a combination of washers 24 and corrugated ribbon 33 are used as a packing material about the unthreaded portion 33 of stud 32 beneath dome 27.

The embodiment as shown in FIG. 3 is similar to that of FIG. 2A except that an enlarged plug 37 of packing material is disposed over the unthreaded surface 25 of stud 32 and is sandwiched between washers 24 of increasingly less diameter to conform to the opening 15 in glass lining 11 and the undersurface of dome-shaped cap 27.

Figure 4:
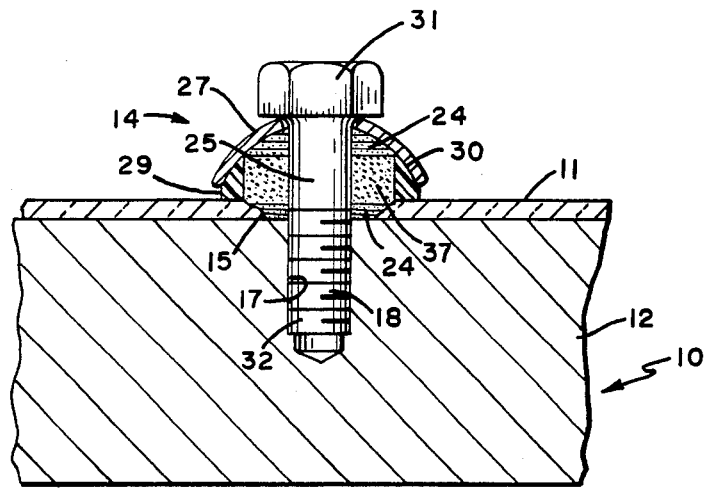

The embodiment of FIG. 4 is the same as the embodiment of FIG. 3 except that nut 35 is replaced by bolt head 31 on stud 32. In these embodiments both washers 24 and enlarged ring 37 are formed of a compactible and flexible packing material such as the mentioned Grafoil flexible graphite.

Figure 5:
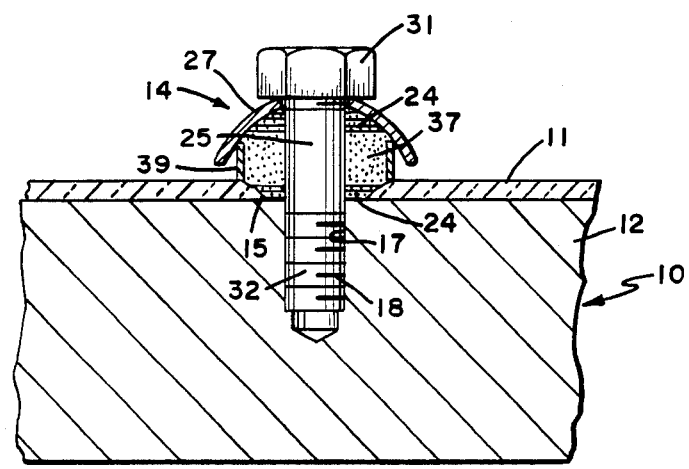

The embodiment of FIG. 5 is the same as that disclosed in FIG. 4 except that in place of containing ring 29 there is provided a metallic ring or hoop 39 about the outer peripheral surface of the packing material for maintaining the latter in position and functioning with cap 27 to squeeze the packing material into sealing position as previously described.

As will now be appreciated by those skilled in the art the above disclosed repair plug assembly 14 has many advantages in use and functions differently from the conventional designs as disclosed in the previously mentioned patents. In brief the conventional design applies the gasket method to seal against the coated surface and cement is used in an attempt to avoid leakage along the threaded stud. Although in the embodiment described the flexible packing material is used about the unthreaded portions 25 respectively of studs 19 or 32 to seal against chemical liquid of a highly corrosive nature such as bromine compounds, these portions 25 may also be threaded.

It is expressly understood that the novel repair plug assembly disclosed is not limited to the embodiments illustrated and described. Various changes can be made in the material and in the design and arrangement of parts without departing from the spirit and scope of the invention as the same will now be understood by those skilled in the art.

What is claimed is:

1. A repair plug assembly for repairing a breach in a glass coated lining of a corrosion resistant vessel wall, said assembly comprising
    (a) a stud secured to said vessel wall and having a partially threaded portion inserted in the breach and a second portion exposed at said lining surface,
    (b) a flexible and compactible packing material disposed over said breach and about the surface of said exposed portion of said stud,
    (c) containing means about the periphery of said packing material,
    (d) a concave dome-shaped cap mounted over said packing material and having a central aperture therein through which extends the free end of said exposed portion of said stud, and
    (e) means on said stud applying pressure to said cap against said packing material to simultaneously squeeze the material into sealing position against both the exposed portion of said stud and the glass coated surface of said vessel on and about said breach.

2. The device of claim 1 wherein said packing material is of a flexible graphite type containing no resin binders or fillers such as sold under the trademark Grafoil.

3. The device of claim 1 wherein the lower peripheral edge of said dome-shaped cap is disposed at an angle of about 60° relative to the glass coated surface of said vessel.

4. The device of claim 1 wherein the portion of said stud in said breach extends through the vessel wall, spherical washers provided about said extended end and a locking nut applied to said extended end to maintain said stud in position.

5. The device of claim 4 wherein said means for pressing said cap against the packing material includes a head on the end of said stud bearing against the surface of said dome-shaped cap upon tightening of said nut.

6. The device of claim 1 wherein said packing material comprises a plurality of washers mounted over said unthreaded portion beneath said dome-shaped cap and wherein said containing means comprise a ring member about the periphery of said washers.

7. The device of claim 6 wherein said washers vary in diameter to conform to both the concave undersurface of said dome-shaped cap and circumference of said containing ring member.

8. The device of claim 1 wherein said packing material is a ribbon material wrapped about the exposed unthreaded portion of said stud beneath said dome-shaped cap and wherein said containing means comprise a ring member about the outer surface of said ribbon material.

9. The device of claim 8 wherein compactible washers are disposed atop said graphite ribbon beneath said dome-shaped cap.

10. The device of claim 2 wherein said packing material includes a plug shaped member mounted over said exposed portion of said stud and sandwiched between upper and lower washers and wherein said containing means comprise a ring member about the outer surface of said plug shaped member.

11. A device as in any of claims 6, 8, 9 or 10 in which the containing ring member is made of a tetrafluoroethylene resin material and has a lower peripheral edge seated on the surface of said glass coated lining encircling the breach and an upper peripheral wedge shaped edge engaging the undersurface of said dome-shaped cap.

12. A device as in any of claims 6, 8, 9 or 10 in which the containing ring member is made of a metal and has a lower peripheral surface seated on said glass coated lining encircling the breach and an upper peripheral edge engaging the undersurface of said dome-shaped cap.

13. A method of repairing a defect in the glass lining of a corrosion resistant metal walled vessel, comprising the steps of
 (a) drilling a hole in the metal wall at the center of the defect;
 (b) swedging the glass coating about the hole formed in the metal wall,
 (c) inserting a repair stud in said hole leaving an exposed portion of said stud projecting beyond said glass lining,
 (d) applying a flexible and and compactible packing material within a ring member to said swedged area and about said exposed stud portion to seal said defect, and
 (e) affixing a dome-shaped cap member to said stud applying pressure to said flexible packing material to simultaneously seal the latter against said exposed stud portion and said glass surface.

14. The method of claim 13 wherein said flexible packing material is made from flexible graphite material manufactured and sold under the trademark Grafoil.

* * * * *